Jan. 19, 1954  F. E. WILLIAMS  2,666,881

AUXILIARY COMMUTATING-FIELD WINDING

Filed June 14, 1952

WITNESSES:

INVENTOR
Frank E. Williams.
BY
ATTORNEY

Patented Jan. 19, 1954

2,666,881

UNITED STATES PATENT OFFICE 2,666,881

AUXILIARY COMMUTATING-FIELD WINDING

Frank E. Williams, McKeesport, Pa., assignor to Westinghouse Electric Corporation, East Pittsburgh, Pa., a corporation of Pennsylvania Application June 14, 1952, Serial No. 293,634

7 Claims. (Cl. 318—336)

My invention relates to direct-current motors and generators, and particularly to variable-speed shunt motors of a size in which variation of the commutating-pole excitation is required for good commutation under different shunt-field conditions.

An important novel feature of my invention relates to the use of an auxiliary commutating winding which has more turns than the main or series commutating winding, and which is so connected and excited as to be responsive to the variable load-current of the machine, so as to provide a commutating-pole excitation-adjustment which is suitable for all loads from no-load to considerably beyond full-load. The general object of my invention is to dispense with the necessity for providing special shunts around the main or series commutating field winding, sometimes requiring more than 100 amperes to be shunted at the highest speeds, which is quite objectionable from the standpoint of resistor-sizes, lead-sizes, and the contactor-sizes which are required.

My invention is an improvement over, or a substitute for, or possibly an addition to, the invention which is described and claimed in a companion Pasculle application, Serial No. 293,637, filed June 14, 1952, wherein the auxiliary commutating field winding is energized so as to be responsive to adjustments in the excitation of the shunt-type field-winding, but not directly responsive to the magnitude of the load-current.

Figure 1:
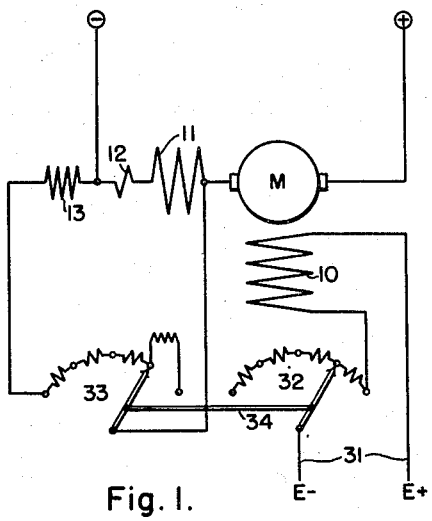
Figure 2:
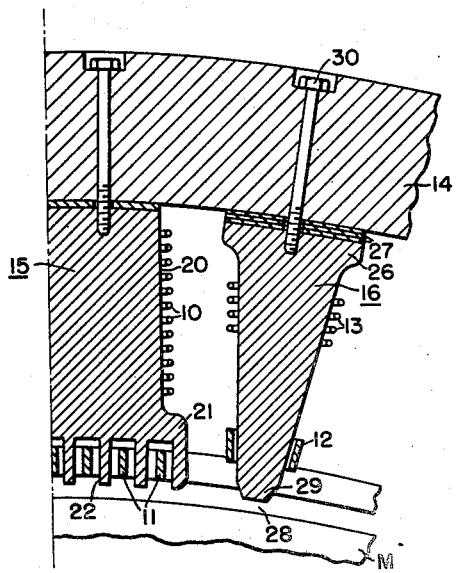

With the foregoing and other objects in view, my invention consists in the machines, combinations, systems, connections, parts, and methods of design and operation, as hereinafter described, and illustrated in the accompanying drawing, wherein:

Figure 1 is a diagrammatic view of circuits and apparatus, illustrating my invention in a preferred form of embodiment, and Fig. 2 is a fragmentary view illustrating the positioning of the windings on the field-frame of an illustrative motor or generator embodying my invention.

My invention, while possibly not altogether limited thereto, is particularly applicable to, or needed in, direct-current shunt-excited dynamo-electric machines, particularly motors, in sizes above a 28-inch armature-diameter, with pole-numbers ranging from 6 poles, with a 32-inch armature-diameter, up to 24 poles, with a 144-inch armature-diameter, or even larger machines, if they are built. My invention is particularly applicable to variable-speed motors, which require shunt-field excitations which are varied over a rather considerable range, for considerable speed-variation or control. At present, the largest commerical use of my invention is in the field of variable-speed motors, such as are used in steel-mills, and in many other industrial uses.

In Fig. 1, I have diagrammatically indicated my invention as applied to a machine which I will refer to, for convenience, as being a motor. It includes an armature M, a shunt-type field-winding 10 which may be either separately or self-excited, a series compensating winding 11, a series commutating winding 12, and an auxiliary commutating winding 13 of more turns than the series commutating winding 12. The motor is essentially a shunt-motor, which either has no series field winding (as shown), or if a series field winding is used at all it will have only a small compounding-effect.

As shown in Fig. 2, the field-frame of the motor comprises a cylindrical yoke 14, having main poles 15 and commutating poles or interpoles 16 bolted thereto. In accordance with a known practice, the main poles have a pole-shank portion 20, which carries the shunt-field winding which is diagrammatically indicated at 10 in Fig. 2, and a pole-tip portion 21 having slots 22 for receiving the compensating winding 11. The interpole 16 carries both the main or series commutating winding 12 and the auxiliary commutating winding 13, both of which are diagrammatically indicated in Fig. 2. In accordance with a known practice, the rear end 26 of the interpole 16 is spaced from the yoke or frame-member 14 by means of a plurality of magnetizable shims 27, the number of which can be varied, for the purpose of adjusting the effective interpolar airgap 28 between the face 29 of the interpole and the periphery of the armature or rotor-member M. It will be understood that the number of the rear-end shims 27 can be adjusted by removing the bolts 30, and then reassembling the interpoles 16, with the desired number of shims back of them.

Referring again to Fig. 1, it will be seen that my shunt-field winding 10 is provided with field-winding terminals which are marked E— and E+. In most commercial applications of my invention, the shunt-field winding 10 will be separately excited, so that the field-winding terminals E— and E+ will be connected to a separate source of excitation, other than the voltage which appears across the terminals of the armature M, although my invention is also applicable to a self-excited machine, in which the field-winding terminals E— and E+ are connected across the terminals of the armature M, or across the supply-line (+) and (—). In either event, whether separately excited or self-excited, my shunt-field winding 10 is necessarily provided with a shunt-field excitation-circuit 31 which includes a shunt-field regulating-means 32, either manual or automatic, for varying the excitation of the shunt-field winding over a considerable range, this regulating-means being indicated in the form of a field-rheostat 32, which is intended to be representative of any field-varying means.

The main armature-circuit of the motor, as shown in Fig. 1, is connected across a suitable constant-voltage direct-current supply-line, represented by the terminals (+) and (—), such as a 600-volt direct-current line, for example. The series compensating winding 11 and the series commutating winding 12 are connected as a series-winding circuit-portion 11—12 which is in turn connected in series with the armature M, and all three serially connected parts are connected across the supply-line represented by the terminals (+) and (—).

When the shunt-field winding 10 is separately excited its excitation-terminals E+ and E— are commonly connected to a constant-voltage supply-line having a smaller voltage, for example 200 volts, although of course I am not limited to these details, in the application of my invention.

In accordance with my present invention, a variable rheostat 33 is connected in series with the auxiliary commutating winding 13, and said rheostat 33 and said auxiliary commutating winding 13 are connected in parallel circuit relation with respect to some portion or all of the series winding-means 11 and/or 12 which are connected in series with the armature M, so as to be responsive to the motor-current, and hence to the motor-load. In order to reduce the current which is carried by the auxiliary commutating winding 13, it is more desirable to use more turns, with a smaller current and a higher voltage, than to use a smaller number of turns and a larger current and a smaller voltage, in the auxiliary commutating winding 13. It is quite desirable, therefore, to connect the rheostat 33 and the auxiliary commutating winding 13 in parallel circuit relation with respect to the terminals of the entire series-winding circuit-portion, including both the series compensating winding 11 and the series commutating winding 12, as shown in Fig. 1.

It is quite preferable, although perhaps not obligatory, in practicing my invention, to connect the auxiliary commutating winding 13 in such polarity that its excitation is differential, with respect to the excitation of the main or series commutating winding 12. In this way, the current which is drawn by the auxiliary commutating winding 13 serves to reduce the total effective excitation of the interpole or commutating pole 16, thus serving substantially the same function as the previously used commutating-winding shunt, with the important exception, however, that my auxiliary commutating winding 13 requires only 10 to 20 amperes, for example, to produce the same effect as a 100-ampere shunt, connected across the series commutating winding 12 in accordance with the prior-art practice. If the auxiliary commutating winding 13 had been cumulatively excited, it would still have been possible to control the total interpolar excitation of the two commutating windings 12 and 13, by means of a rheostatic adjustment of the auxiliary-winding excitation, but in general the control would not be as sensitive as with the preferred differential connection of the auxiliary commutating winding 13. It will be observed that this differential connection of the auxiliary commutating winding 13 is preferred, regardless of whether the machine is operating as a motor or a generator.

Where the shunt-field current is varied over a considerable range, say from full-field to a value which is from 15 to 25% of the full-field current, as in variable-speed motors, the commutation-requirements are such that certain increases must be made in the interpole-flux, as the shunt-field excitation is increased, as in the previous practice. To this end, I mechanically connect the variable rheostat 33 of the auxiliary commutating winding 13 to the field-rheostat 32, as shown at 34, or I provide other equivalent means for causing these two rheostats to be simultaneously adjusted. These adjustments are usually made by testing the motor at full load.

While the essential connections and physical structures have thus far been described, it is important to note the relative degrees of magnitudes of the total effective interpolar excitation which is provided by the combined operation of both of the commutating windings 12 and 13. It is necessary, also, to bear in mind the essential object of my invention, which is to provide the interpolar excitation-control or adjustment which is necessary to give each individual machine satisfactory commutation, and to do this without requiring the heavy-current shunting-resistors which have been previously used, in this type of machine, for adjusting the excitation of the main series commutating winding 12.

The ideal interpolar or commutating excitation-curve for a direct-current machine, plotting the total effective ampere-turns on the interpole 16 (in excess of the excitation necessary for compensation), against the load or armature-current, is a straight line, starting at zero ampere-turns at no-load, and running up to a certain definite magnitude, or narrow range of magnitudes, at a predetermined load which is at least as large as full load, and sometimes somewhat higher than full load. In other words, the commutating conditions must be right, not only at no load but also at this predetermined load-value which is full-load or higher than full-load. At extreme overloads, such as double full load, or two and three-quarters times full load, interpole-saturation definitely comes into the picture, and the interpolar excitation need not always be ideal for such conditions.

The machines to which my invention is applied are big machines, which are individually hand-adjusted, on the test-floor, to have the proper operating-characterstics, before said machines are sold or put into use. The main or series commutating winding 12 is made of heavy strap-conductors, frequently having only one turn for each interpole, and the number of turns, and hence the ampere-turns, of this main series commutating winding 12, cannot readily be adjusted, except by means of the previously used commutating-winding shunt or an auxiliary multiturn commutating winding 13, either differential or cumulative, as in my present invention. It is essential that the total interpolar flux shall approximate an ideal value at the previously mentioned load-condition which is at least as large as full load, and this is done through the double expedients of adjusting the rheostat 33 which controls the current through the auxiliary commutating winding 13, and sometimes also adjusting the interpolar airgap-length 28 by means of the number of rear-end shims 27. Frequently, however, it will be more economical to take care of all adjustments by adjustments of the auxiliary-winding rheostat 33, thereby dispensing with the necessity for readjusting the number of shims 27 after the machine has been tested.

It will be apparent from the foregoing, that I have overcome the disadvantages of the previously needed heavy-current commutating-winding shunts, by the use of auxiliary multiturn commutating-windings which carry much smaller currents, and which interpose no problem in securing the necessary adjustments. I wish it to be understood that my invention is not limited to the precise illustrations given.

I claim as my invention:

1. A direct-current motor including an armature, a shunt-type field-winding, a series compensating winding, a series commutating winding, an auxiliary commutating winding of more turns than the series commutating winding, a variable rheostat connected in series with said auxiliary commutating winding, and means for connecting said rheostat and said auxiliary commutating winding in a shunt circuit across a series winding-means which is connected in series with said armature, characterized by the excitation of the auxiliary commutating winding being differential with respect to the excitation of the series commutating winding, the motor having interpoles which carry the two commutating windings, the respective excitation-values of the two commutating windings and the effective interpolar airgap being so related that the total interpolar flux approximates an ideal value for satisfactory commutation at a load-condition approximating a load at least as large as full load.

2. A direct-current generator including an armature, a shunt-type field-winding, a series compensating winding, a series commutating winding, an auxiliary commutating winding of more turns than the series commutating winding, a variable rheostat connected in series with said auxiliary commutating winding, and means for connecting said rheostat and said auxiliary commutating winding in a shunt circuit across a series winding-means which is connected in series with said armature, characterized by the excitation of the auxiliary commutating winding being differential with respect to the excitation of the series commutating winding, the generator having interpoles which carry the two commutating windings, the respective excitation-values of the two commutating windings and the effective interpolar airgap that the total interpolar flux approximates an ideal value for satisfactory commutation at load-condition approximating a load at least as large as full load.

3. A direct-current dynamo-electric machine including an armature, a shunt-type field-winding, a series compensating winding, a series commutating winding, said series compensating winding and said series commutating winding being connected as a series-winding circuit-portion in series with the armature, an auxiliary commutating winding of more turns than the series commutating winding, said auxiliary commutating winding being differential with respect to the main commutating winding, a variable rheostat connected in series with said auxiliary commutating winding, and means for connecting said rheostat and said auxiliary commutating winding in parallel circuit relation with respect to the terminals of said series-winding circuit-portion.

4. A direct-current dynamo-electric machine including an armature, a shunt-type field-winding, a shunt-field excitation-circuit including a shunt-field regulating-means for varying the excitation of said shunt-type field winding over a considerable range, a series compensating winding, a series commutating winding, an auxiliary commutating winding of more turns than the series commutating winding, a variable rheostat connected in series with said auxiliary commutating winding, means for connecting said rheostat and said auxiliary commutating winding in a shunt circuit across a series winding-means which is connected in series with said armature, and means for mechanically connecting said rheostat and said shunt-field regulating-means for simultaneous adjustment.

5. A variable-load variable-speed motor as defined in claim 4, characterized by the excitation of the auxiliary commutating winding being differential with respect to the excitation of the series commutating winding, the motor having interpoles which carry the two commutating windings, the respective excitation-values of the two commutating windings and the effective interpolar airgap being so related that the total interpolar flux approximates an ideal value for satisfactory commutation at a load-condition approximating a load at least as large as full load at all values of the shunt-field excitation.

6. A variable-load adjustable-field generator as defined in claim 4, characterized by the excitation of the auxiliary commutating winding being differential with respect to the excitation of the series commutating winding, the generator having interpoles which carry the two commutating windings, the respective excitation-values of the two commutating windings and the effective interpolar airgap that the total interpolar flux approximates an ideal value for satisfactory commutation at a load-condition approximating a load at least as large as full load at all values of the shunt-field excitation.

7. A direct-current dynamo-electric machine including an armature, a shunt-type field-winding, a shunt-field excitation-circuit including a shunt-field regulating-means for varying the excitation of said shunt-type field-winding over a considerable range, a series compensating winding, a series commutating winding, said series compensating winding and said series commutating winding being connected as a series-winding circuit-portion in series with the armature, an auxiliary commutating winding of more turns than the series commutating winding, said auxiliary commutating winding being differential with respect to the main commutating winding, a variable rheostat connected in series with said auxiliary commutating winding, means for connecting said rheostat and said auxiliary commutating winding in parallel circuit relation with respect to the terminals of said series-winding circuit-portion, and means for causing said rheostat and said shunt-field regulating-means to be simultaneously adjusted.

FRANK E. WILLIAMS.

References Cited in the file of this patent

UNITED STATES PATENTS

| Number | Name | Date |
| --- | --- | --- |
| 1,188,396 | Binder | June 27, 1916 |
| 1,215,786 | Fahrmbacker | Feb. 13, 1917 |
| 1,910,473 | McNeil | May 23, 1933 |
| 2,508,151 | Fisher | May 16, 1950 |
| 2,519,272 | Miner, Jr. | Aug. 15, 1950 |
| 2,530,982 | Miner, Jr. | Nov. 21, 1950 |

FOREIGN PATENTS

| Number | Country | Date |
| --- | --- | --- |
| 98,099 | Austria | Oct. 10, 1924 |